United States Patent
Gargi et al.

(10) Patent No.: US 8,051,089 B2
(45) Date of Patent: Nov. 1, 2011

(54) SYSTEMS AND METHODS FOR LOCATION-BASED REAL ESTATE SERVICE

(75) Inventors: Ullas Gargi, San Jose, CA (US); Ramin Samadani, Menlo Park, CA (US); Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1303 days.

(21) Appl. No.: 10/427,572

(22) Filed: Apr. 30, 2003

(65) Prior Publication Data

US 2004/0220906 A1  Nov. 4, 2004

(51) Int. Cl.
  *G06F 17/30*  (2006.01)
(52) U.S. Cl. ............... 707/758; 348/207.1; 715/202; 715/230
(58) Field of Classification Search ............. 707/3, 736, 707/758; 705/27, 26; 701/200, 213–215
  See application file for complete search history.

(56) References Cited

U.S. PATENT DOCUMENTS

| | | | | |
|---|---|---|---|---|
| 5,247,356 A | * | 9/1993 | Ciampa | 348/144 |
| 5,414,462 A | * | 5/1995 | Veatch | 348/135 |
| 5,794,216 A | * | 8/1998 | Brown | 705/27 |
| 5,944,769 A | | 8/1999 | Musk et al. | |
| 5,946,687 A | | 8/1999 | Gehani et al. | |
| 6,081,609 A | | 6/2000 | Narioka | |
| 6,148,090 A | | 11/2000 | Narioka | |
| 6,148,260 A | | 11/2000 | Musk et al. | |
| 6,236,343 B1 | | 5/2001 | Patapoutian | |
| 6,282,489 B1 | | 8/2001 | Bellesfield et al. | |
| 6,321,158 B1 | | 11/2001 | DeLorme et al. | |
| 6,323,885 B1 | | 11/2001 | Wiese | |
| 6,385,541 B1 | | 5/2002 | Blumberg et al. | |
| 6,397,143 B1 | * | 5/2002 | Peschke | 701/208 |
| 6,498,982 B2 | | 12/2002 | Bellesfield et al. | |
| 6,636,803 B1 | * | 10/2003 | Hartz et al. | 701/208 |
| 7,010,144 B1 | * | 3/2006 | Davis et al. | 382/100 |
| 7,978,219 B1 | * | 7/2011 | Imes | 348/207.1 |
| 2002/0065739 A1 | * | 5/2002 | Florance et al. | 705/26 |
| 2003/0052896 A1 | * | 3/2003 | Higgins et al. | 345/619 |
| 2004/0183918 A1 | * | 9/2004 | Squilla et al. | 348/211.2 |

* cited by examiner

*Primary Examiner* — Robert Timblin

(57) ABSTRACT

A system and method for searching real estate properties, a system and method for estimating the size of an area, and a system and method for associating an image with information relevant to the image is disclosed. A system for searching real estate properties comprises a data storage unit configured to store map information, additional relevant georeferenced information and information about real estate properties, including information identifying the locations of the real estate properties; and a display unit configured to receive a search request from a user, communicate with the data storage unit, and provide search results to the user, including a map showing locations of real estate properties, in response to the search request, the display unit being further configured to displaying a user interface with which the user may associate information, personal to the user, with a particular real estate property.

26 Claims, 8 Drawing Sheets

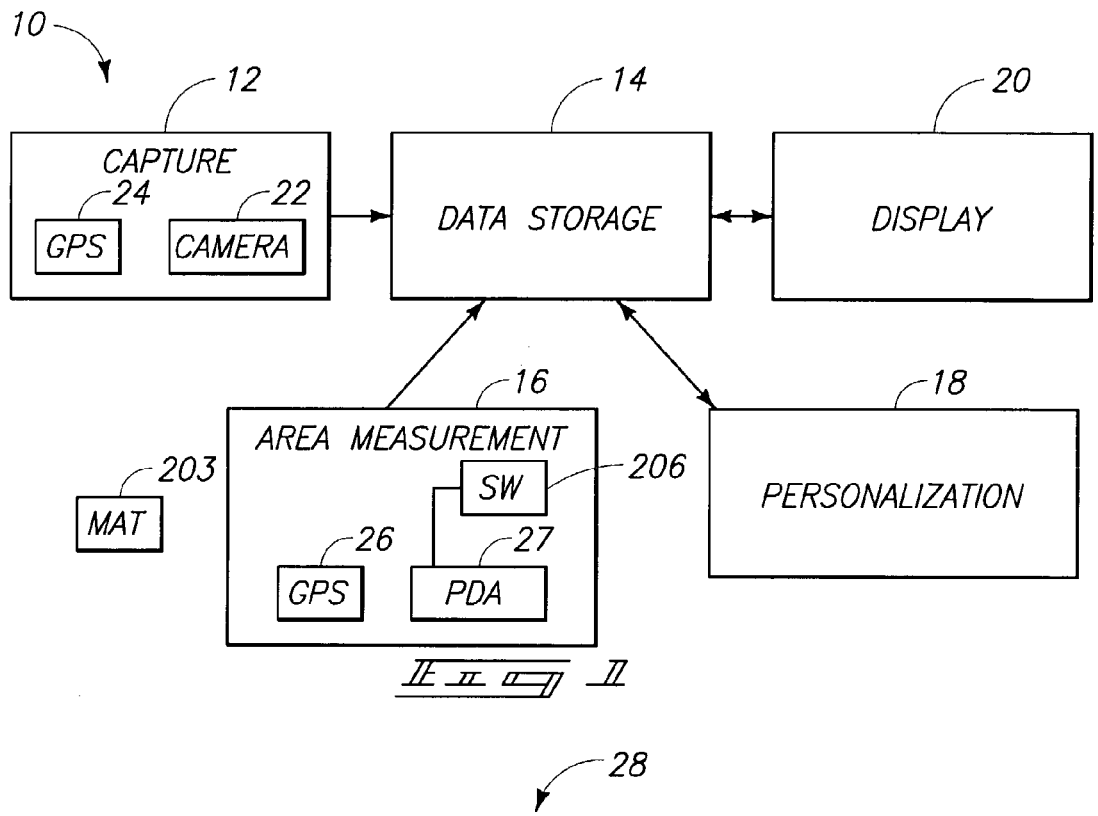

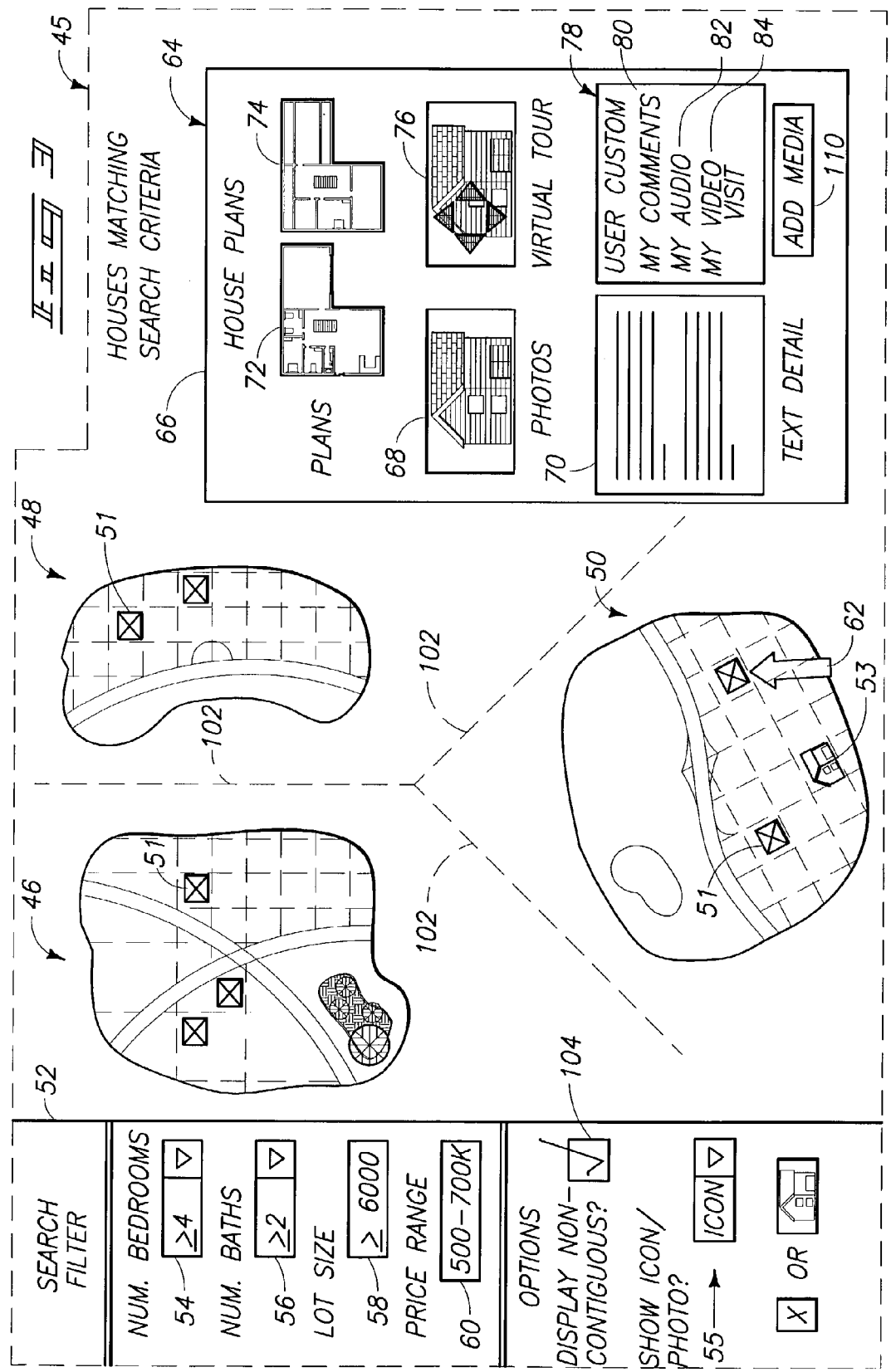

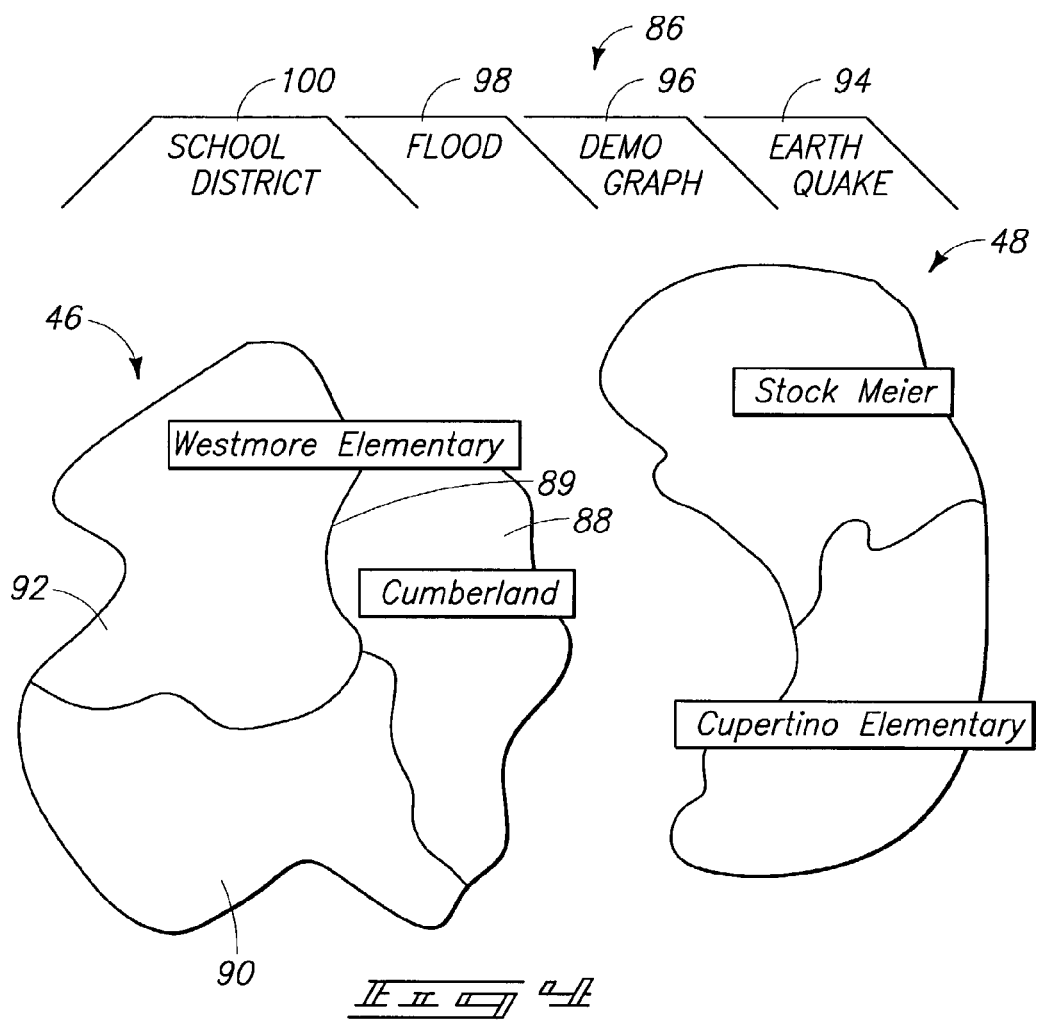
FIG. 4
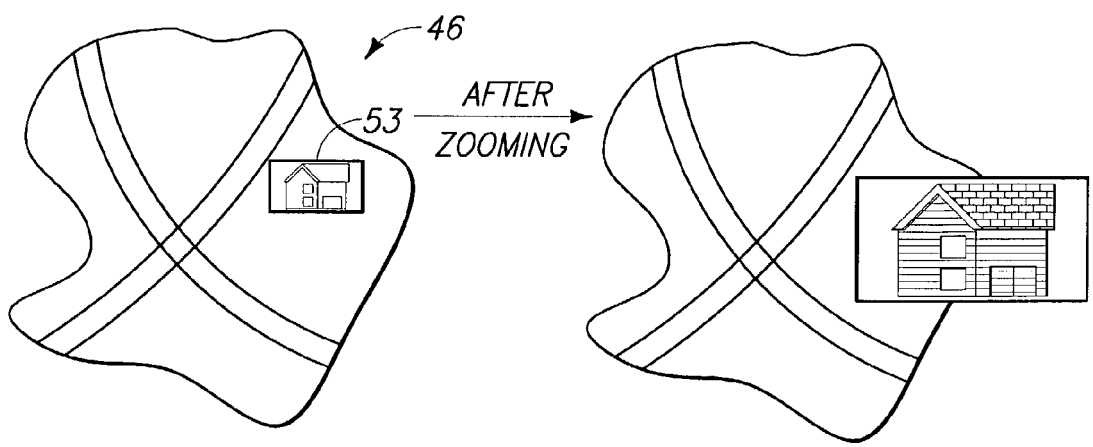
OPTION: OTHER MAP ELEMENTS REMAIN @ CONSTANT SIZE 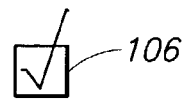
FIG. 5

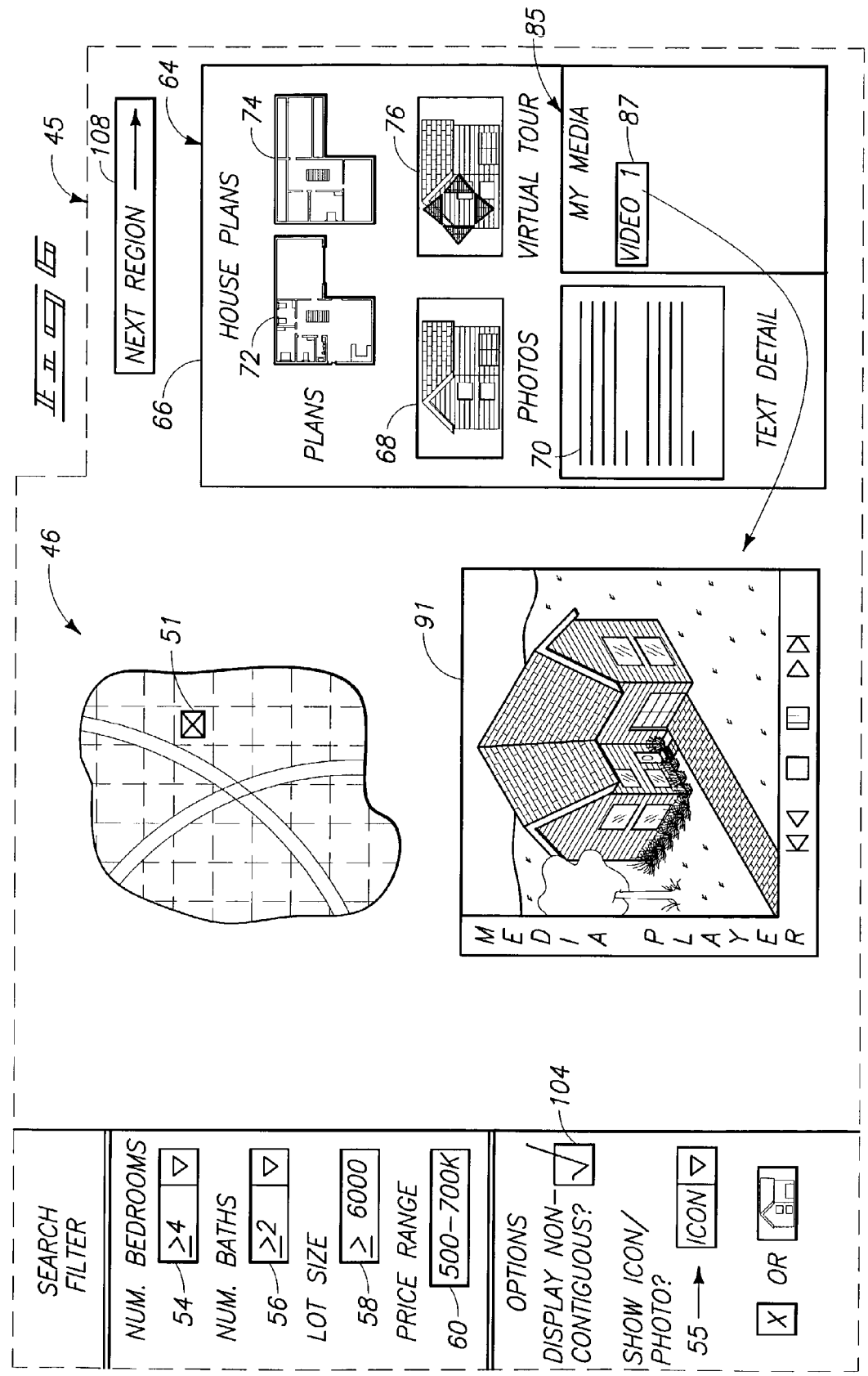

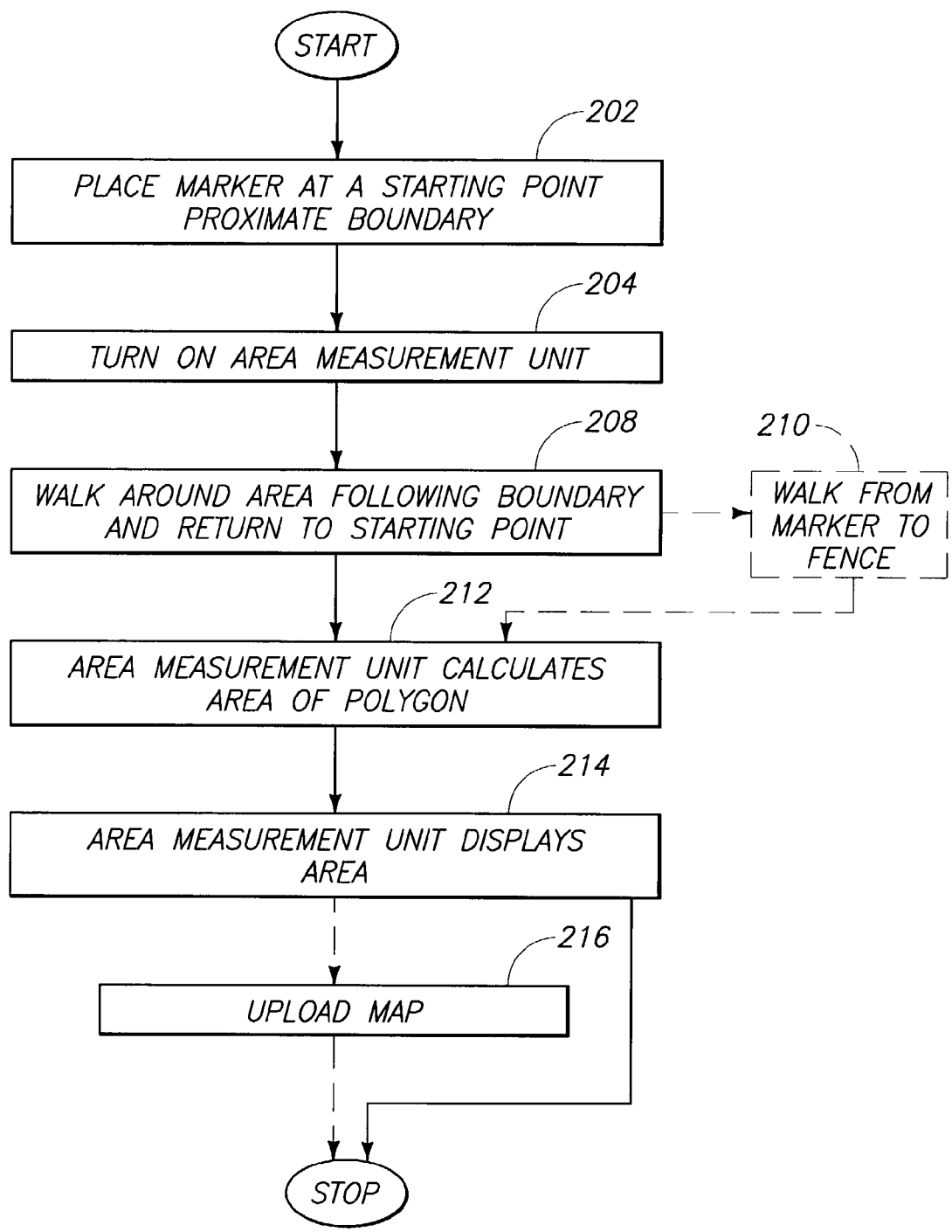

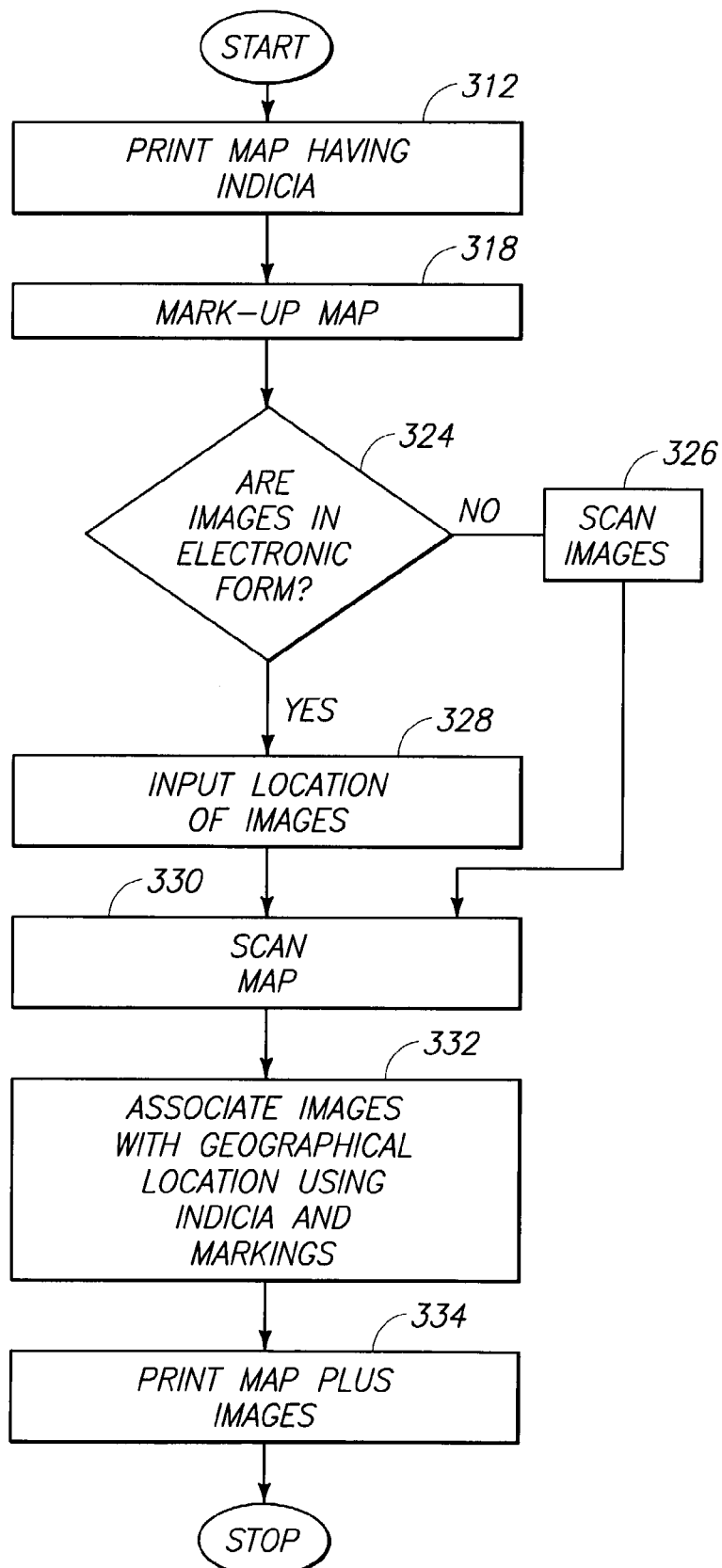

| IMAGE # | YEAR | – | MONTH | – | DAY | HOUR | MINUTE | SECOND |
|---------|------|---|-------|---|-----|------|--------|--------|
| 1 | 2002 | – | 11 | – | 12 | 14 | 59 | |
| | | | | | | | | |
| | | | | | | | | |
| | 402 | | 404 | | 408 | 410 | 412 | 414 |

SYSTEMS AND METHODS FOR LOCATION-BASED REAL ESTATE SERVICE

FIELD OF THE INVENTION

The invention relates to mapping systems and methods. The invention also relates to multimedia systems and methods, and to GPS systems and methods.

BACKGROUND OF THE INVENTION

There is a well known maxim that, in real estate, the three most important things are: location, location, location. However, existing MLS (Multiple Listing Service) databases do not provide location-based aggregations of information. For example, the MLS does not provide a consolidated view of all the houses matching the buyer's criteria. This makes it difficult to quickly compare two houses. The MLS does not provide any easy way to look at relative geographical locations of two houses. The MLS does not provide any easy way to add personal notes for houses. The MLS does not provide any easy way to add any other information, such as school ratings, school districts, traffic patterns, shop locations, county and city tax rates, etc. in a geographic specific manner.

Some prior art solutions, such as the MLS, may involve databases that store location information and pictorial information together, but do not provide an integrated way of browsing and searching them. For example, to find a specific house for sale in a search, using prior art systems, a lot of text search criteria has to be entered such as city name and number of bedrooms. A list of hits is then generated. The list has to be viewed and each hit has to be clicked on to determine where a house is located. There is no easy way to search using a map based interface. At best, some systems used by Realtors might offer maps with recent sales in a neighborhood. In addition, a potential buyer cannot easily independently verify lot size. Further, there is no systematic way of recording the houses that the potential buyer has physically visited for comparison purposes.

SUMMARY OF THE INVENTION

The invention provides systems and methods for searching real estate properties.

One aspect of the invention provides a system and method of searching real estate properties, the system and method comprising storing, in a database, map information and information about real estate properties, including information identifying the locations of the real estate properties, and using a display unit, receiving a search request from a user, communicating with the database, and providing search results to the user, including a map showing locations of real estate properties, in response to the search request, and displaying, using the display unit, a user interface with which the user may associate information, personal to the user, with a particular real estate property.

Another aspect of the invention provides a system for searching real estate properties, the system comprising means for defining a database for storing map information and information about real estate properties, including information identifying the locations of the real estate properties, and means for receiving a search request from a user, communicating with the database, and providing search results to the user including a map showing locations of real estate properties, in response to the search request, and for defining a user interface with which the user may associate information, personal to the user, with a particular real estate property.

Yet another aspect of the invention provides a system and method of estimating the size of an area, the area having a boundary, the system and method comprising placing a marker at a location proximate the boundary; transporting an area measurement unit having a GPS unit and a processor, starting at the marker and following the boundary until returning to the marker; and calculating the size of the area using the area measurement unit.

Still yet another aspect of the invention provides a system and method of associating an image with geographical information relevant to the image, the method comprising providing a map encoded with machine readable indicia identifying locations on the map, marking the map to indicate the location where the image was captured, scanning the map, and decoding the machine readable indicia and the marking to associate the image with the location where the image was captured.

These and other aspects of the present invention will be discussed in greater detail hereinafter.

BRIEF DESCRIPTION OF THE VIEWS OF THE DRAWINGS

FIG. 1 is a block diagram of a system according to one embodiment of the invention.

FIG. 2 illustrates an interface showing a search page used with the system of FIG. 1 to request a database search in accordance with one embodiment.

FIG. 3 is a screen shot illustrating a sample map view that is generated in response to the search requested using the search page of FIG. 2, including an interface for filtering search results, including house details, and including an interface for use in uploading media in accordance with one embodiment.

FIG. 4 is a screen shot illustrating a map including an overlay, in accordance with one embodiment.

FIG. 5 is a screen shot illustrating a zoom feature, in accordance with one embodiment.

FIG. 6 illustrates an interface showing how to launch multimedia after it has been uploaded, in accordance with one embodiment.

FIG. 8 is a block diagram illustrating a system for associating geographical information with an image, in accordance with one embodiment.

FIG. 9 is a flowchart illustrating operation of the system of FIG. 8.

FIG. 10 illustrates a form that can be used with the system of FIG. 8 to add timestamp information to an image, in accordance with one embodiment.

DETAILED DESCRIPTION OF THE INVENTION

Figure 7:
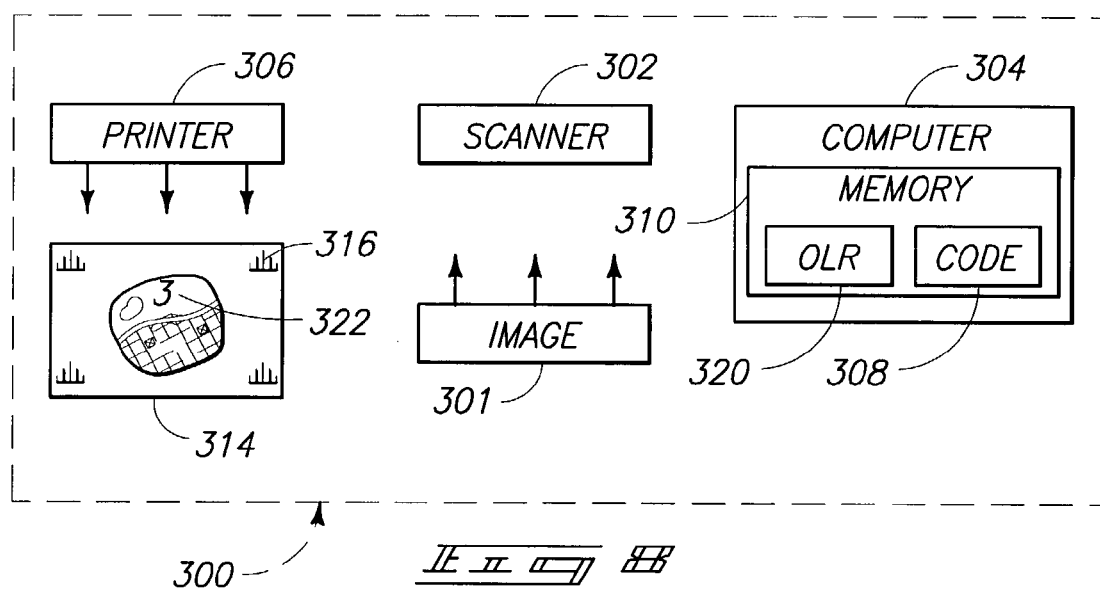
FIG. 7 is a flowchart illustrating a method of estimating the size of a real estate lot in accordance with one embodiment.

This disclosure of the invention is submitted in furtherance to the constitutional purposes of the U.S. Patent Laws to promote the progress of science and the useful arts.

FIG. 1 shows a geo-spatial system 10 embodying various aspects of the invention. The system 10 includes at least some of a data capture unit 12, a data storage unit 14, an area measurement unit 16, a personalization unit 18, and a display unit 20.

The data capture unit 12 includes, for example, a digital camera 22 and a GPS receiver 24. The data capture unit 12 is selectively used to capture multimedia data along with GPS information. The GPS information can be used to determine location information corresponding to the captured multimedia data. Multimedia data can include photo, video, and/or audio data.

The data storage unit 14 stores information about real estate properties. More particularly, the data storage unit 14 includes a database which stores the multimedia data captured by the data capture unit 12 and information about real estate properties such as location data (information identifying the locations of real estate properties such as addresses), together with annotation (e.g., user's text or audio notes) and map information. For example, the data storage unit 14 can include one or more hard drives, optical drives, tape drives, optical drives, RAM, ROM, and/or any other appropriate storage hardware. In one embodiment, the data capture unit further includes software configured to define a database. The data capture unit can further include or be accessed using a processor. In one embodiment, the data storage unit 14 is defined by a file server. In another embodiment, the data storage unit 14 is defined by a disk array.

In one embodiment, the data capture unit 12 is selectively coupled to the data storage unit 14 via a network, such as a WAN, LAN, or the Internet. Alternatively, removable media such as a floppy disk or memory card can be removed from the data capture unit 12 and inserted into the data storage unit 14 or into a reader coupled to the data storage unit 14, for file transfer between the data capture unit 12 and the data storage unit 14.

The display unit 20 dynamically and interactively presents multimedia data and a map, or portion of a map, from the data storage unit 14, to a user in an integrated way. In one embodiment, the display unit 20 is a client machine, such as a terminal or personal computer.

In one embodiment, the display unit 20 is coupled to the data storage unit or server 14 via a network, such as a WAN, LAN, or the Internet.

The area measurement unit 16 includes, for example, a GPS receiver 26 to continuously sample coordinates and a processor and display or computer (e.g., a PDA) 27 to perform a computation of area. This will be discussed in greater detail below. The area measurement unit 16 can be omitted from the system 10, combined with capture system 12, or can be a separate, self-contained system, in alternative embodiments.

The personalization unit 18 generates individual results for individual customers. This will also be discussed in greater detail below.

Using the system 10, a user (e.g., real estate buyer, seller, or agent) interacts with a dynamic multimedia real estate flyer, which is a digital multimedia document created by the system 10 and presented to the user. More particularly, the flyer is created using the system 10, stored in the system 10, and selectively searched and retrieved from or using the system 10.

In operation, a user begins a search for houses or properties, for example by specifying region(s) of interest using a search form 28 such as the one shown in FIG. 2 and, if desired, other information. The search form 28 is accessed and filled using the display unit or client 20. In the illustrated embodiment, the search form 28 is a graphical user interface or web page that can be manipulated using a touch screen or cursor, keyboard, and/or mouse included in the display unit 20. Using the form 28, a region of interest is specified using fields 30, 32, and 34 for city, state, and/or zip. Other fields included in the search form can include, for example, fields 36 and 38 for specifying a price range, field 40 to specify a number of bedrooms, field 42 to specify a number of bathrooms, or fields for additional search options (not shown) such as type of property (condo, single family, multifamily, vacant lot), nearby intersection or neighborhood or point of interest, etc.

After the fields are filled, the user requests a search; e.g., by pressing a search button 44. This causes a search request to be communicated from the display unit 20 to the data storage unit 14. The data storage unit 14 processes the search request and presents to the display unit 20 a screen 45 (see FIG. 3) including a map of the area or multiple non-contiguous maps 46, 48, and 50 showing locations (e.g., of houses, condos, lots, buildings) meeting the search criteria. The data storage unit 14 determines which map or non-contiguous maps to display, depending on the search criteria, then determines where properties that match the search criteria should be displayed on the map. This can occur in a manner similar to that of Mapquest.com™ service, described in U.S. Pat. No. 6,498,982 to Bellesfield et al., and U.S. Pat. No. 6,282,489 to Bellesfield et al., both of which are incorporated herein by reference.

Properties that match the search criteria are shown on the map as icons 51, in one embodiment, and are shown on the map in locations corresponding to their actual physical locations, within tolerance. In one embodiment, the icons are color-coded or otherwise marked to indicate strength of match. Alternatively, the strength of a match can be otherwise indicated graphically or alphanumerically, or can be omitted. In another embodiment, properties that match the search criteria are shown on the map as thumbnails 53 of pictures of the property, at least for properties for which pictures are available, to aid the user's memory of the house.

In the embodiment shown in FIG. 3, a user may set preferences whether icons 51 or thumbnails 53 (where available) are presented, using an interface input feature 55 (e.g., pull down menu, radio buttons, check boxes or other input mechanism).

The user may interact with the map or maps 46, 48, and 50 by drawing arbitrary regions to specify a new area of interest (e.g., by using a mouse to define boundaries of an area on the map to be enlarged, or by using a mouse to drag a map in a direction to expose adjacent areas not yet on the screen).

The screen 45 further includes a filter interface 52 with which a user can further affect or filter the search, such as by specifying, changing, or restricting various parameters. The parameters that can be filtered include, for example, the number of bedrooms and/or bathrooms, lot size, or price range in input fields 54, 56, 58, and 60. Properties that match the filtered search criteria are shown on the map or maps 46, 48, and 50 as icons 51 or thumbnails 53 as described above.

The system 10 provides for tightly-coupled searching and browsing, i.e., the user can change his/her criteria and the map and matching houses are updated in real time.

Obtaining details of particular houses may be implemented in a variety of ways. For example, in one embodiment, a user can select a house, for example, with an input device such as a mouse by moving the mouse pointer or curser 62 over a house icon 51 or thumbnail 53 to cause a window or frame (or refreshes an area) 64 ("real estate flyer") to pop up with details 66 on the property located at the location indicated by the icon 51 or thumbnail 53. The details 66 include a (e.g., larger) photo 68 and can include, for example, alphanumeric information 70 such as text or an image of text, describing the property, floor plans or architectural drawings of the property 72, 74, a virtual tour 76 (e.g., defined by a VRML, QuickTime, or other virtual reality file), and/or a user custom interface 78. Using the user custom interface 78, an individual user can view or upload comments 80, audio 82, and video 84 generated using the capture unit 12 (FIG. 1). Alternatively, the details can appear in a separate window when the house is clicked on. The personalization unit 18 causes comments 80, audio 82, and video 84 for a particular user to be presented to that user, e.g., by using a login ID and/or cookies or other authentication system. The different details 68, 70, 72, 74, 76, and 78 may, in alternative embodiments, be shown in different frames or different windows and would be updated by moving a mouse pointer over or using a mouse to clicking on different icons.

When a user interface feature 80, 82, or 84 is chosen or clicked, in one embodiment, a list 85 of files of the relevant type is shown, as is indicated in FIG. 6. When one of the listed files 87 is chosen or clicked, in one embodiment, an appropriate player or viewer 91 is launched.

In one embodiment, shown in FIG. 4, a user may specify different overlays on the map or maps using tabs, buttons, or other input features 86. The overlays may include, for example, lines 89 or color coding 88, 90, 92 to show earthquake fault zones 94, demographics 96, flood areas 98, school districts 100, etc., to be displayed or delineated. The information for the overlays are obtained, in one embodiment, from standard public records such as county records and US Census data and are either stored in the data storage unit 14 or retrieved when needed (e.g., via a network such as the Internet) from an appropriate server (not shown).

In another embodiment, different overlays on the map may be automatically generated in order to organize the search results displayed to the user. For example, if the user searches for homes within a price range, a secondary index may be formed based on number of bedrooms, on whether the home is single family or multiple-unit or any other criteria preferred by the user. In this case, overlays are automatically generated for "all" the search results and shown to the user first. Generated automatically, however, and available to the user are additional overlays such as "1 bedroom", "2 bedroom", "3 bedrooms" and "4 or more bedrooms". These are stored such that if the user would like these overlays, they are quickly available. This method helps add flexibility and improves the speed of the searches.

A user may choose to view maps of geographically non-contiguous regions simultaneously, as shown in FIG. 3, or one at a time, as shown in FIG. 6. Viewing maps of geographically non-contiguous regions simultaneously could be of value when, for example, a user wishes to search properties in, for example, two widely separated areas, or two areas separated by an undesirable area. In this case the screen shows (on the display unit 20) maps 46, 48, and 50 for two or more areas, separated by a display element 102 (e.g., a dashed line) indicating the discontinuity. For example, a search request for homes above a certain price may produce results in multiple non-contiguous regions. A user may, in one embodiment, elect that non-contiguous maps be shown using an interface input feature or mechanism 104 (e.g., a check box, radio button, pull down menu, etc.).

As shown in FIG. 6, non-contiguous regions can also be toggled using an interface input mechanism such as a button 108.

In one embodiment, shown in FIG. 5, zooming in to a map 46 (e.g., using a view, zoom feature in a toolbar or using a zoom icon or by making a zoom selection from a menu that appears when rightclicking) causes thumbnail photos 53 of the houses to be zoomed in. Alternatively, when zooming in to a map 46, the underlying map elements remain at a constant size, thus covering the same geographical area, but the sizes of the house images 53 grow. This allows users to simultaneously view the various homes being compared. In one embodiment, a selection can be made using an interface feature 106.

The user who creates data (a "multimedia real estate flyer") for the house detail 64 shown in FIG. 3 (or, more particularly, for access using the user custom interface 78) using the system 10 may visit some of the houses and create audio, video or text annotations for each house, or for multiple houses in sequence, using the data capture unit 12. These annotations can include, for example, audio comments such as impressions recorded while walking through or around a house, and/or video captured while walking through or around a house. In one embodiment, the data capture unit 12 includes a keyboard or touchscreen (e.g., and includes handwriting recognition capabilities), text annotations, such as notes taken from comments made by the agent showing a house (e.g., "the roof is a 40 year roof") etc.

The user can then add these personal records to the multimedia flyer by employing an editing mode; e.g, by clicking on or choosing an add media user interface feature 110 (shown in FIG. 3). The annotations are automatically assigned to the correct house by employing GPS information associated with each media and comparing to the known locations of the houses. The next time the user views the real estate flyer or house detail data 64, he/she will view/hear the personal information in addition to the public information.

FIG. 7 illustrates a method of using the area measurement unit 16 (FIG. 1) to determine (estimate) the area of a lot, front or back yard, building boundary, or other real estate area.

Lot size is measured, in one embodiment by walking around the house and recording GPS track. In one embodiment, the GPS unit 26 is an inexpensive, non-survey quality, logging GPS receiver. The area measurement unit 16 is used to allow real estate agents or prospective real estate clients to very easily determine the shapes and the areas of a property lot, a front or back yard, and of a building boundary. In general, lot size information is currently provided by agents in very approximate terms. Additional shape and size information provided by the area measurement unit 16 can supplement the approximate lot size information to aid agents and clients during presentation, shopping and comparisons. Additionally, because the area measurement unit 16 includes GPS, the unit 16 or system 10 can upload to a display device or a printer to provide a drawn outline or "map", aligned with North or South. This additional information can be used, for example, to show the sun exposure of the house.

The method for determining shape and area is as follows.

In step 202, a user (e.g., a real estate agent or potential real estate customer) places a marker 203 (FIG. 1) which may be provided with the area measurement unit 16, at a starting point, close to the boundary or perimeter being measured. The marker 203 can be, for example, a mat, a stake, or any other appropriate marker.

In step 204, the user steps on or stands on the marker and turns on the area measurement unit or tracker 16; e.g., using a switch or button 206. In one embodiment, the area measurement unit 16 automatically starts tracking a new boundary when started.

In step 208, the user transports the area measurement unit 16, e.g., by walking or otherwise moving around the property, yard, or area of property to be measured, following the boundary, and returns to the starting point. The starting point is indicated to the user by the marker 203. In one embodiment, the unit 16 determines from GPS readings that it has returned to the starting point and makes an area calculation and displays the area. In another embodiment, the user interacts with the unit 16 (e.g., presses a button) to inform the unit 16 that the transporting has ended and to begin the calculation.

It is possible that a fence or wall may make it difficult for the user to exactly follow the boundary. If there is a fence, for example, the user will have to walk inside or outside of the fence. Therefore, in one embodiment, to get more accurate results, after the user returns to the marker 203, the user walks from the marker 203 to the property fence in step 210. This distance is used later to correct the calculated lot shape and area.

In step 212, the area measurement unit 16 calculates area. The tracking device provides a polygon (with probably many points) that describes the lot (or yard or building) boundary. Algorithms for finding areas of polygons are known in the art and are found, for example, in "A Programmer's Geometry" by A. Bowyer and J. Woodwark and will not be described in detail herein. In one embodiment, the area measurement unit 16 converts GPS latitude and longitude to x,y distances (e.g., in meters), relative to the centroid of the polygon In one embodiment, the area measurement unit 16 immediately displays calculated area, in step 214, after it is calculated.

Optionally, in step 216, the user can upload to generate a geographically aligned "map" of the property to display on a PC or to print on a printer.

FIG. 8 illustrates a system 300 for associating an image with geographical information. The geographical information is relevant to the image, in one embodiment. The system 300 includes, for example, a scanner 302, a computer 304 coupled to the scanner, and a printer 306 coupled to the computer 304 or separate from the computer. For example, the printer can be coupled to a different computer. In an alternative embodiment, a combined printer/scanner is employed. The computer includes optical character recognition software 320, such as software typically bundled with scanners.

Given one or more images or photos 301, it may be desirable to associate each image with geographical information relevant to the images (e.g., the location at which each image was captured). It may also be desirable to create a map with images at corresponding locations even when GPS units are not available. This method is particularly useful when users only want approximate location for annotation, but do not require exact latitude and longitude coordinates.

A method of using the system of FIG. 8 is illustrated in FIG. 9. FIG. 9 also describes computer program code 308 embodied in a memory 310 (e.g., floppy disk, hard drive, CD ROM, or any other type of memory such as ROM or RAM) and that is selectively loaded for execution in the computer 304. The computer 304 is configured to cause the printer 306 to print a map or various maps. The maps may be included with a software package containing the computer program code 308 or may be separately stored in or retrieved using the computer 304.

In a method illustrated in FIG. 9, in step 312, a map 314 of the whole area where the images 301 were captured is printed using printer 306. This map 314 could be, for example, a map of a city, a map of a county, a map of a state, a map of a country, or other geographic area. The printed map 314 contains machine readable indicia 316 such as, for example, registration marks and/or barcodes encoding the latitude/longitude of locations on the map. In the illustrated embodiment, the marks are provided at two or more corners of the map and indicate latitude and longitude of the locations at the corners of the map. Other locations between the corners are determined by the computer 304 using interpolation.

In step 318, a user marks locations 322 on the map 314 corresponding to the images 301. The marks could be serial numbers (1, 2, 3 etc.) or other encoding easily recognized by optical character recognition software 320 included in the computer 304. In one embodiment, the user makes the marks by hand.

In step 324, a determination is made as to whether the images are to be scanned or are in electronic form.

In step 326, the user scans in the images or photos if they are in print form. If the images are in electronic form, the user indicates the location (e.g., folder) in the computer containing the images if they are digital photos in step 328. More particularly, in one embodiment, the computer 304 provides prompts asking the user to indicate the location of files or to indicate if the images are to be scanned. In some embodiments, the computer 304 prompts the user to identify the location of or scan in the images in the order corresponding to the order of the serial numbers described in step 318. For example, the computer 304 first prompts the user to identify the location of or scan in image 1, then image 2, then image 3, etc.

The user scans in the map 314 in step 330. In an alternative embodiment, the map 314 is scanned before the images are scanned (e.g., step 330 is moved before step 324 and after step 318).

In step 332, the computer 304 associates each numbered mark 322 on the map with the corresponding image 301. Each image or photo 301 is now annotated with its location. The location information can be used in a variety of applications. For example, the code 308 allows a map with each photo in miniature at the capture location to be printed, in step 334.

For video, a still image, such as a thumbnail, or a cluster of images such as a thumbnail cluster of the video, can be printed at each location and the process of FIG. 9 can be performed using a thumbnail (or thumbnails) as the image 301. Other types of multimedia files can also be similarly associated with map indices using location marks 322.

The images may be scanned using, for example, the Automatic Photo Feed (APF) attachment to the PhotoSmart scanners manufactured by the assignee of the present invention, or other scanners.

The system of FIG. 8 can also be used to add other data to images. For example, FIG. 10 illustrates adding timestamp information to one or more images or photos, such as a group of scanned in photos. The term timestamp, as used herein, is to be construed as including time information, date information, or both time and date information.

A user prints a form 400 with a date field or fields (e.g., year-month-day 402, 404, 408, optionally hour-minute-second 410, 412, 414), fills in the date field(s) for the images scanned in, scans the form back in, and the system 300 performs OCR on the digits and attaches the timestamp(s) to the scanned-in images.

This makes digital images obtained from scanned analog photos equal citizens with digital images obtained from digital cameras, in that date and/or time of capture can be attached if so desired.

In one embodiment, the method of FIG. 9 is used, instead of GPS, to couple personal media to a particular house shown in FIG. 3. In one embodiment, a user can snap photos of multiple houses, then print a map and mark houses on the map. Logical association is used to couple a photo to the correct house shown in FIG. 3. For example, variable, hyperlinks, or database techniques can be used to associate a photo to one of the houses based on the markings on the map. A user marks locations on the map as described above in connection with step 318. As long as a mark is made closer to one house in FIG. 3 than another, the location of the marks on the map do not have to be exact. The logical association can be used in applications other than the real estate application of FIG. 3. In one embodiment, logical association is used to couple a photo to a correct geographic location on a map; e.g., where multiple specific locations have previously been identified in a database search or otherwise.

In compliance with the patent statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computing device for searching real estate properties, the computing device comprising:
    a data storage unit configured to store digital multimedia documents, each digital multimedia document comprising map information and information about a particular real estate property, including information identifying the location of the real estate property;
    a display unit configured to receive a search request from a user, wherein the search request from the user includes basic property information, communicate with the data storage unit, and provide search results to the user, including a map showing locations of real estate properties, in response to the search request,
    the display unit further including a user interface with which the user is able to associate personal information with the particular real estate property to create a digital multimedia document for the particular real estate property, wherein the personal information includes or text annotations related to the particular real estate property, wherein the text annotations are specific to the user and created by the user at the location of the real estate property, and wherein the personal information is different from the basic property information of the search request; and
    a data capture unit including at least a camera and a GPS unit, the data capture unit configured to capture the personal information created by the user, wherein the personal information is automatically assigned to the digital multimedia document for the particular real estate property concurrently with the creation of the personal information by the user by employing GPS information associated with the personal information and comparing it to a shown location, from the search results provided to the user, of the particular real estate property, and
    wherein different users can create different personal information associated with the same property to create different digital multimedia documents for the same property such that each digital multimedia document is stored at the data storage unit to allow the user to view each digital multimedia document with the personal information at a later time.

2. A computing device for searching real estate properties in accordance with claim 1 wherein, using the display unit, the user is able to associate multimedia information with a particular real estate property for which a location is shown on the map.

3. A computing device for searching real estate properties in accordance with claim 2, wherein the data capture unit is configured to generate the multimedia information, and wherein, using the display unit, the multimedia information from the camera and GPS information from the GPS unit are communicated to the data storage unit.

4. A computing device for searching real estate properties in accordance with claim 3 wherein, using the GPS information and the real estate location information, the data storage unit is configured to associate the communicated multimedia information with the real estate location information in the data storage unit, such that the multimedia information is associated in the data storage unit with the location at which the multimedia information was captured.

5. A computing device for searching real estate properties in accordance with claim 1 and further configured to provide a search filter interface on the display unit with which a user can cause search results to be filtered.

6. A computing device for searching real estate properties in accordance with claim 5 wherein the search filter interface includes a field for specifying at least one of number of bedrooms, number of bathrooms, lot size, and price range.

7. A computing device for searching real estate properties in accordance with claim 1 wherein the map showing locations of real estate properties shows the locations on the map using one of icons and thumbnail photos of the properties at the respective locations.

8. A computing device for searching real estate properties in accordance with claim 7 wherein the display unit is configured to display a user interface feature with which a user can select whether locations shown on the map are shown as icons or thumbnails.

9. A computing device for searching real estate properties in accordance with claim 7 wherein the display unit is configured to, in response to the user selecting one of the icons and thumbnail photo, display information particular to the property associated with the selected icon.

10. A computing device for searching real estate properties in accordance with claim 1 wherein search results are shown, using the display unit, using multiple, simultaneously displayed, non-contiguous maps.

11. A computing device for searching real estate properties in accordance with claim 1 wherein the display unit is configured to display a user interface feature with which a user can select whether search results are shown using multiple, simultaneously displayed, non-contiguous maps or multiple pages each having a map.

12. A computing device for searching real estate properties in accordance with claim 1 wherein the display unit is configured to display user interface features with which a user can select overlays to be shown over the map.

13. A computing device for searching real estate properties in accordance with claim 1 wherein the display unit is configured to display tabs with which a user can select overlays to be shown over the map.

14. A computing device for searching real estate properties in accordance with claim 13 wherein the overlays include color coding.

15. A computing device for searching real estate properties in accordance with claim 13 wherein the overlays cause one of school zones and earthquake areas to be shown on the map.

16. A computing device in accordance with claim 7 wherein zooming in on a map, using the display unit, causes thumbnail pictures, but not the map, to be enlarged.

17. The computing device of claim 1, further comprising:
    an area measurement unit to determine the shape and area of a real estate area.

18. A computing device for searching real estate properties in accordance with claim 1, wherein the personal information includes at least one of photo, video and audio annotations.

19. A method of searching real estate properties and creating digital multimedia documents, the method comprising:
   storing, in a database, map information and information about real estate properties, including information identifying the locations of the real estate properties;
   using a display unit, receiving a search request from a user, wherein the search request includes basic property information, communicating with the database, and providing search results to the user, including a map showing locations of real estate properties, in response to the search request, and displaying the search results, using the display unit;
   a user interface with which the user is able to associate personal information with a particular real estate property to create a digital multimedia document for the particular real estate property, wherein the personal information includes text annotations related to the particular real estate property, wherein the text annotations are specific to the user and created by the user at the location of the real estate property, and wherein the personal information is different from the basic property information;
   using a data capture unit to capture the personal information, wherein the data capture unit includes at least a camera and a GPS unit;
   automatically assigning the personal information created by the user to the digital multimedia document for the particular real estate property concurrently with the creation of the personal information by the user by employing GPS information associated with the personal information and comparing it to a shown location, from the search results provided to the user, of the particular real estate property; and
   storing the digital multimedia document to allow the user to view the digital multimedia document with the personal information at a later time.

20. The method of searching real estate properties and creating digital multimedia documents of claim 19, further comprising:
   determining the shape and area of a real estate area using an area measurement unit.

21. A computing device for searching real estate properties, the computing device comprising:
   means for defining a database for storing map information and information about real estate properties received by a property lister, including information identifying the locations of the real estate properties; and
   means for receiving a search request from a user, wherein the search request includes basic property information, communicating with the database, and providing search results to the user including a map showing locations of real estate properties, in response to the search request, and for defining a user interface with which the user is able to enter personal information with a particular real estate property to create a digital multimedia document for the particular real estate property, wherein the personal information includes or text annotations related to the particular real estate property, wherein the text annotations are specific to the user and created by the user at the location of the real estate property, and wherein the personal information is different from the basic property information;
   means for storing the digital multimedia document; and
   a data capture unit including at least a camera and a GPS unit, the data capture unit configured to capture the personal information created by the user, wherein the personal information is automatically assigned to the digital multimedia document for the particular real estate property concurrently with the creation of the personal information by the user by employing GPS information associated with the personal information and comparing it to a shown location, from the search results provided to the user, of the particular real estate property, and wherein different users can create different personal information associated with the same property to create different digital multimedia documents for the same property such that each digital multimedia document is stored to allow the user to view each digital multimedia document with the personal information at a later time.

22. The computing device of claim 21, further comprising:
   an area measurement unit to determine the shape and area of a real estate area.

23. A computing device for searching real estate properties comprising:
   a data storage unit configured to store digital multimedia documents, each digital multimedia document comprising map information and information about a particular real estate property, including information identifying the location of the real estate property;
   a display unit configured to receive a search request from a user, wherein the search request includes basic property information, communicate with the data storage unit, and provide search results to the user, including a map showing locations of real estate properties, in response to the search request, the display unit further including a user interface with which the user is able to annotate multimedia information, which is created by the user, with the particular real estate property shown on the map, wherein the multimedia information includes text annotations related to the particular real estate property, wherein the text annotations are specific to the user and created by the user at the location of the real estate property, wherein the multimedia information is different from the basic property information; and
   a data capture unit configured to generate the multimedia information, the data capture unit including a camera and a GPS unit, wherein, using the display unit, the user is able to cause the multimedia information from the camera and GPS information from the GPS unit to be communicated to the data storage unit, wherein, using the GPS information and the real estate location information, the data storage unit is configured to automatically assign the communicated multimedia information to a digital multimedia document for the real estate location in the data storage unit, such that the multimedia information is associated in the data storage unit with the location at which the multimedia information was captured concurrently with the creation of the multimedia information created by the user, which is stored to allow the user to view the digital multimedia document with the multimedia information at a later time.

24. A computing device for searching real estate properties in accordance with claim 23 wherein the display unit is configured to display tabs with which a user can select overlays to be shown over the map.

25. A computing device for searching real estate properties in accordance with claim 24 wherein the overlays cause one of school zones and earthquake areas to be shown on the map.

26. The computing device of claim 23, further comprising:
   an area measurement unit to determine the shape and area of a real estate area.

* * * * *

UNITED STATES PATENT AND TRADEMARK OFFICE
CERTIFICATE OF CORRECTION

PATENT NO. : 8,051,089 B2
APPLICATION NO. : 10/427572
DATED : November 1, 2011
INVENTOR(S) : Ullas Gargi et al.

Page 1 of 1

It is certified that error appears in the above-identified patent and that said Letters Patent is hereby corrected as shown below:

In column 9, line 34, in Claim 1, after "includes" delete "or".

In column 11, line 57, in Claim 21, after "includes" delete "or".

Signed and Sealed this
Seventeenth Day of July, 2012

David J. Kappos
*Director of the United States Patent and Trademark Office*